US009824250B2

(12) United States Patent
Jones

(10) Patent No.: US 9,824,250 B2
(45) Date of Patent: Nov. 21, 2017

(54) LOCATION INFORMATION WITHIN AN AREA DEFINED BY A GRID OF RADIO-FREQUENCY TAG CIRCUITS

(71) Applicant: Trimble Inc., Sunnyvale, CA (US)

(72) Inventor: Edward Jones, Palo Alto, CA (US)

(73) Assignee: Trimble Inc., Sunnyvale, CA (US)

( * ) Notice: Subject to any disclaimer, the term of this patent is extended or adjusted under 35 U.S.C. 154(b) by 224 days.

(21) Appl. No.: 14/071,109

(22) Filed: Nov. 4, 2013

(65) Prior Publication Data
US 2015/0123770 A1    May 7, 2015

(51) Int. Cl.
*H04Q 5/22* (2006.01)
*G06K 7/10* (2006.01)
*G01C 21/20* (2006.01)
*G01S 1/68* (2006.01)
*G01S 13/75* (2006.01)

(52) U.S. Cl.
CPC ....... *G06K 7/10366* (2013.01); *G01C 21/206* (2013.01); *G01S 1/68* (2013.01); *G01S 13/75* (2013.01)

(58) Field of Classification Search
CPC ......... G06K 7/10366; G06K 19/07705; G01C 21/3407; G01C 21/206; G01C 21/3661; G01S 1/68; G01S 13/75
USPC ........................................................ 340/10.1
See application file for complete search history.

(56) References Cited

U.S. PATENT DOCUMENTS

| 6,252,508 B1 | 6/2001 | Vega et al. | |
|---|---|---|---|
| 7,605,688 B1 * | 10/2009 | Seah | G01S 13/825 340/425.5 |
| 7,652,577 B1 * | 1/2010 | Madhow | G06K 7/10346 340/572.1 |
| 2002/0190845 A1 * | 12/2002 | Moore | G06K 7/10336 340/10.3 |
| 2006/0022038 A1 * | 2/2006 | Hewlin | G06K 7/10039 235/385 |
| 2006/0062582 A1 * | 3/2006 | Suzuki | H04B 10/502 398/183 |
| 2007/0023512 A1 * | 2/2007 | Miller | G07G 1/009 235/385 |
| 2007/0046434 A1 * | 3/2007 | Chakraborty | G06K 7/0008 340/10.1 |

(Continued)

FOREIGN PATENT DOCUMENTS

| WO | 2007/099416 | 9/2007 |
|---|---|---|
| WO | 2009/117604 | 9/2009 |

OTHER PUBLICATIONS

International Search Report and Written Opinion of PCT/US2014/063860 dated Mar. 5, 2015, 11 pages.

*Primary Examiner* — Zhen Y Wu
(74) *Attorney, Agent, or Firm* — Kilpatrick Townsend & Stockton LLP

(57) ABSTRACT

A system for determining a location within an area defined by a grid of radio-frequency (RF) tag circuits includes RF exciters that are configured to emit unmodulated RF energy. The grid of the RF tag circuits are configured to receive the unmodulated RF energy from one or more of the RF exciters and to emit modulated RF energy. Each RF tag circuit may store information associated with a location of the RF tag circuit within the area and the modulated RF energy emitted from each RF tag circuit may carry the information.

16 Claims, 6 Drawing Sheets

(56) References Cited

U.S. PATENT DOCUMENTS

| | | | | |
|---|---|---|---|---|
| 2007/0096908 A1* | 5/2007 | Chu | ............... | G09B 21/008 340/572.1 |
| 2009/0267741 A1* | 10/2009 | Li | ............... | H04Q 9/00 340/10.1 |
| 2010/0201520 A1* | 8/2010 | Stern | ............... | G01S 13/878 340/572.1 |
| 2011/0109434 A1* | 5/2011 | Hadsall, Sr. | ............... | G08B 21/22 340/8.1 |
| 2011/0195701 A1* | 8/2011 | Cook | ............... | G01S 5/0018 455/422.1 |
| 2012/0092130 A1* | 4/2012 | Chung | ............... | G08B 13/2462 340/10.1 |
| 2012/0119883 A1* | 5/2012 | Bekritsky | ............... | G06K 7/10356 340/10.4 |
| 2012/0127976 A1* | 5/2012 | Lin | ............... | G01S 13/82 370/338 |
| 2014/0170970 A1* | 6/2014 | McFarthing | ............... | H04B 5/0062 455/41.1 |

* cited by examiner

LOCATION INFORMATION WITHIN AN AREA DEFINED BY A GRID OF RADIO-FREQUENCY TAG CIRCUITS

TECHNICAL FIELD

Embodiments described herein relate generally to location information within an area defined by a grid of radio-frequency (RF) tag circuits, and more particularly, to systems and methods for providing and/or using the location information.

BACKGROUND

Wireless technologies exist that allow exchange of data over short distances. Examples include radio-frequency identification (RFID), WiFi, and Bluetooth. These technologies have been used in a number of different applications including some applications related to providing location information. As an example, RFID has been used to provide location information that can be used for navigation in places where the capabilities of global navigational satellite system (GNSS) receivers are limited (see, for example, U.S. Publication No. 2011/0043373, filed Aug. 20, 2009, the contents of which are incorporated herein by reference in their entirety for all purposes). WiFi has also been used to provide location information that can be used in similar situations (see, for example, P. Bahl and V. N. Padmanabhan, "RADAR: an in-building RF-based user location and tracking system," Proceedings of 19th Annual Joint Conference of the IEEE Computer and Communications Societies (IN-FOCOM '00), vol. 2, pp. 775-784, Tel Aviv, Israel, March 2000). Despite these applications, new and improved applications are constantly sought that allow wireless technologies to provide and use location information.

SUMMARY

Some embodiments described herein enable a mobile device to determine its location within an area defined by a grid of RF tag circuits. The RF tag circuits may be powered by unmodulated RF energy emitted from RF exciters arranged throughout the area. Each RF tag circuit stores information associated with its location within the area and emits modulated RF energy that carries the information. The mobile device may receive the modulated RF energy from one or more of the RF tag circuits and determine its location within the area based on the the received information.

Other embodiments use the location information to determine a path through the area. The location of the mobile device within the area may be used as a starting location. A first RF tag circuit may be identified that is proximate to the starting location, and a second RF tag circuit may be identified that is proximate to a destination. One or more additional RF tag circuits may be identified that form a path between the first and second RF tag circuits. A message may be sent to the first RF tag circuit, the second RF tag circuit, and the one or more additional RF tag circuits with instructions to activate a signal to identify the path between the starting location and the destination.

As an example, in accordance with an embodiment a system for determining a location within an area includes a plurality of RF exciters and a grid of RF tag circuits. The plurality of RF exciters may be arranged throughout the area and may be configured to emit unmodulated RF energy. The grid of RF tag circuits may be arranged along a bottom surface of the area and may be configured to receive the unmodulated RF energy from one or more of the plurality of RF exciters. The grid of RF tag circuits may also be configured to emit modulated RF energy upwards in a direction away from the bottom surface. Each RF tag circuit may store information associated with a location of the RF tag circuit within the area and the modulated RF energy emitted from each RF tag circuit may carry the information.

In some embodiments, the system may also include a mobile device configured to receive the modulated RF energy emitted from one or more of the RF tag circuits and to determine a location of the mobile device within the area using the information from the one or more of the RF tag circuits. The system may also include a server configured to receive communications from the mobile device and to send communications to the plurality of RF exciters. The plurality of RF exciters may be further configured to emit modulated RF energy for carrying messages to the RF tag circuits. The RF tag circuits may be individually addressable and configured to receive the messages from the plurality of RF exciters and to activate an audio or visual signal in response to receiving one of the messages. Based on the communications received from the mobile device, the server may be configured to send the messages addressed to certain ones of the RF tag circuits to the plurality of RF exciters for relay to the certain ones of the RF tag circuits.

In an embodiment, the plurality of RF exciters may be configured to use at least one of a radio-frequency identification (RFID), WiFi, or Bluetooth technology to emit the unmodulated RF energy. The RF tag circuits may be configured to use at least one of an RFID, WiFi, or Bluetooth technology to receive the unmodulated RF energy and to emit the modulated RF energy.

In another embodiment, the RF tag circuits may be passive RFID tag circuits.

In another embodiment, the grid of RF tag circuits may be evenly spaced throughout the area.

In another embodiment, the RF tag circuits may emit the modulated RF energy upwards in a direction substantially perpendicular to the bottom surface.

In another embodiment, the bottom surface of the area may be a floor of a building.

In accordance with another embodiment, a method for providing location information within an area defined by a grid of RF tag circuits includes receiving unmodulated RF energy at each of the RF tag circuits from one or more RF exciters and emitting modulated RF energy from each of the RF tag circuits. The unmodulated RF energy may provide power for each of the RF tag circuits. The modulated RF energy may be emitted upwards in a direction away from the bottom surface. The RF tag circuits may be arranged along a bottom surface of the area. Each RF tag circuit may store information associated with a location of the RF tag circuit within the area, and the modulated RF energy emitted from each RF tag circuit may carry the information.

In an embodiment, the method may also include receiving the modulated RF energy from one or more of the RF tag circuits at a mobile device and determining a location of the mobile device within the area using the information carried by the modulated RF energy.

In accordance with another embodiment, a method for providing a path through an area defined by a grid of RF tag circuits includes receiving a location of a mobile device within the area as a starting location. The location of the mobile device may be determined based upon proximity of the mobile device to one or more of the RF tag circuits. A first RF tag circuit may be identified that is proximate to the starting location, and a second RF tag circuit may be identified that is proximate to a destination. One or more additional RF tag circuits may be identified that form the path between the first RF tag circuit and the second RF tag circuit through the grid. A message may be sent to the first RF tag circuit, the second RF tag circuit, and each of the one or more additional RF tag circuits with instructions to activate a signal to identify the path through the area between the starting location and the destination.

In some embodiments, the destination may be a location within the area. In other embodiments, the destination may be a location adjacent to the area.

In an embodiment, the signal may be at least one of an audio signal or a visual signal.

In accordance with yet another embodiment, a method for navigating along a path through an area defined by a grid of RF tag circuits, where the path connects a starting location near a first RF tag circuit with a destination near a second RF tag circuit, includes providing a location of a mobile device within the area as the starting location. The location of the mobile device may be determined based upon proximity of the mobile device to one or more of the RF tag circuits in the grid. The method may also include navigating from the starting location to the destination by sequentially moving from a location near a first activated signal associated with the first RF tag circuit to locations near each of one or more additional activated signals associated with one or more additional RF tag circuits and to a location near a second activated signal associated with the second RF tag circuit.

Numerous benefits may be realized using embodiments described herein over conventional techniques. For example, in some embodiments a grid of RF tag circuits are powered using unmodulated RF energy emitted from RF exciters. The RF tag circuits may be powered continuously so that they can provide modulated RF energy carrying location information. A mobile device, such as a cell phone, can receive the modulated RF energy and determine its location using the location information. In other embodiments, a grid of RF tag circuits may be used that have a relatively short read range. This allows a mobile device to determine its approximate location because it receives location information from only a few of the RF tag circuits. These and other embodiments, along with many other advantages and features, are described throughout the specification.

BRIEF DESCRIPTION OF THE DRAWINGS

In some of the drawings a sub-label is associated with a reference numeral to denote one of multiple similar components. When reference is made to a reference numeral without specifying a sub-label, it is intended to refer to all such similar components.

DETAILED DESCRIPTION

Some embodiments described herein allow a user of a mobile device, such as a smartphone, to determine location information and/or to navigate within an area defined by a grid of RF tag circuits. The RF tag circuits are generally located along the ground or floor within the area. The RF tag circuits may be powered by unmodulated RF energy emitted from RF exciters disposed throughout the area. Each RF tag circuit may store information associated with its location within the area and emit modulated RF energy that carries the information. The mobile device may receive the modulated RF energy from one or more of the RF tag circuits and determine its location within the area using the information. Further, a path through the area from the location of the mobile device to a destination may be determined and messages sent to the RF tag circuits along the path. The messages may include instructions to activate a signal that will identify the path to the user.

Figure 1:
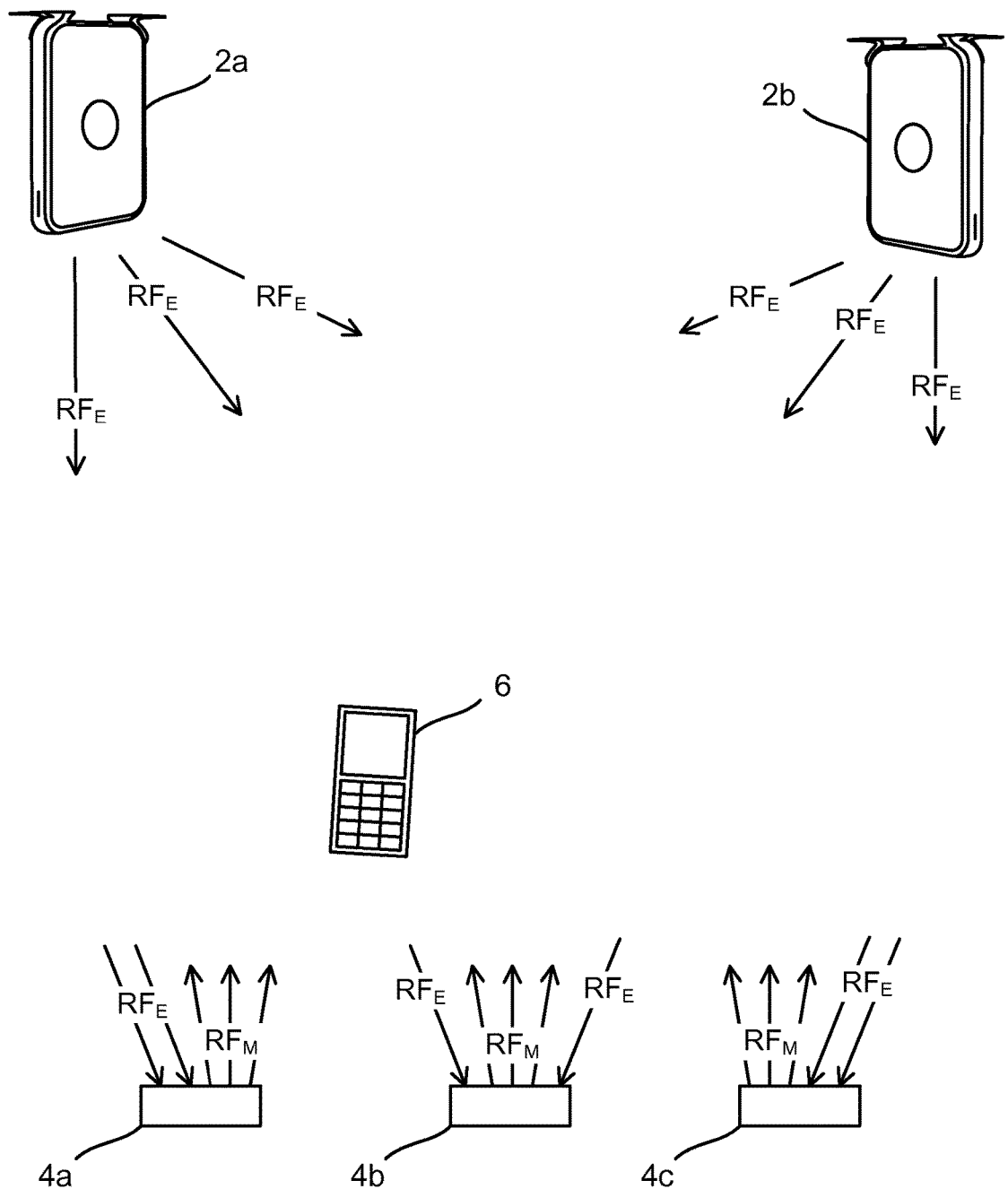
FIGS. 1-2 are simplified diagrams of systems for determining a location of a mobile device within an area defined by a grid of RF tag circuits in accordance with some embodiments.

FIG. 1 is a simplified diagram of a system for determining a location of a mobile device 6 within an area defined by a grid of RF tag circuits 4a, 4b, 4c in accordance with an embodiment. The RF tag circuits 4a, 4b, 4c are configured to receive unmodulated RF energy ($RF_E$) emitted from RF exciters 2a, 2b and emit modulated RF energy ($RF_M$) that is received by the mobile device 6. Each RF tag circuit may be programmed with information identifying its location within the area, and the modulated RF energy ($RF_M$) emitted from each RF tag circuit may carry the information. The modulated RF energy ($RF_M$) from one or more of the RF tag circuits 4a, 4b, 4c may be received by the mobile device 6, and the information may be used to determine the location of the mobile device 6 within the area.

Following is an example of how this may be done in an embodiment where the RF tag circuits 4a, 4b, 4c are arranged along the floor of a building. This example is provided merely for illustration purposes and is not intended to be limiting. In this example, the maximum range of the modulated RF energy ($RF_M$) and the spacing of the RF tag circuits 4a, 4b, 4c are selected so that the mobile device 6 only receives modulated RF energy ($RF_M$) from at most two of the RF tag circuits 4a, 4b, 4c at any time. This means the maximum range of the modulated RF energy ($RF_M$) is less than the distance between adjacent RF tag circuits. Further, in this example each of the RF tag circuits 4a, 4b, 4c stores information, such as two-dimensional (X-Y) coordinates, associated with its location within the building (or within the area). Any other coordinates, such as global positioning system (GPS) coordinates in latitude, longitude, and elevation, may also be used. Each RF tag circuit may be programmed in accordance with known techniques to store the location information. For example, the RF circuit 4A may store the coordinates (1,0), the RF tag circuit 4b may store the coordinates (2,0), and the RF tag circuit 4c may store the coordinates (3,0). In this manner, if the mobile device 6 is directly above one of the RF tag circuits, such as the RF tag circuit 4b, it will most likely receive only the modulated RF energy ($RF_M$) from the RF tag circuit 4b and its (X,Y) location within the building will be about (2,0)—approximately the same as the location of the RF tag circuit 4b. If the mobile device 6 is between two RF tag circuits, such as the RF tag circuits 4a, 4b as shown in FIG. 1, it will most likely receive only the modulated RF energy ($RF_M$) from the RF tag circuits 4A, 4b and its (X,Y) location within the building will be about (1.5,0)—approximately an average of the locations of the RF tag circuits 4a, 4b.

This example illustrates the relationship between the range of the modulated RF energy ($RF_M$) and the spacing of the RF tag circuits 4a, 4b, 4c. The location of the mobile device 6 can be determined more accurately if the RF tag circuits are close together and the mobile device 6 only "sees" or receives modulated RF energy ($RF_M$) from a few of the RF tag circuits. This can be realized by limiting the range of the modulated RF energy ($RF_M$).

In FIG. 1 the grid only includes three RF tag circuits in a single row for simplicity. The concept illustrated may be extended to cover an area of any size with any number of RF tag circuits. The RF tag circuits are generally arranged in a grid of evenly spaced rows and columns but may be arranged in a grid of any pattern. As described in the example provided above, the number and spacing of the RF tag circuits may be selected based the range of the modulated RF energy ($RF_M$) emitted from the RF tag circuits and a desired accuracy in determining the location of the mobile device 6. Because of the limited range of the modulated RF energy ($RF_M$), the area within which the mobile device 6 can determine its location does not extend substantially beyond those RF tag circuits located along the edges of the grid. The RF exciters 2a, 2b, however, may be disposed inside or outside this area (the area within which the mobile device 6 can determine its location).

In some embodiments, the RF tag circuits 4a, 4b, 4c may be passive devices that are powered by the unmodulated RF energy ($RF_E$) received from the RF exciters 2a, 2b. The RF tag circuits 4a, 4b, 4c may receive the unmodulated RF energy ($RF_E$) and emit modulated RF energy ($RF_M$) using RFID, WiFi, Bluetooth, or any similar technology, protocol, or standard. For example, in an embodiment the RF tag circuits 4a, 4b, 4c are passive RFID tag circuits that receive the unmodulated RF energy ($RF_E$) from an RFID exciter and emit the modulated RF energy ($RF_M$) using RFID. In another embodiment, the RF tag circuits 4a, 4b, 4c are passive WiFi tag circuits that receive the unmodulated RF energy ($RF_E$) from a WiFi access point and emit the modulated RF energy ($RF_M$) using WiFi (see, for example, U.S. Patent Publication No. 2010/0137024, the contents of which are incorporated herein by reference in their entirety for all purposes). Other alternatives may be used in other embodiments.

In some embodiments, the RF tag circuits 4a, 4b, 4c are arranged along a bottom surface of the area (e.g., along the floor or ground). For example, the RF tag circuits 4a, 4b, 4c may be disposed in or under the carpet, the tile, or any other floor covering. Alternatively, the RF tag circuits 4a, 4b, 4c may be disposed in or on the ground of an outside area. A benefit of arranging the RF tag circuits 4a, 4b, 4c along the bottom surface is that an average distance from the bottom surface to a mobile device carried by a user is usually less than an average distance from a top surface (e.g. a ceiling) to the mobile device. Further, in some situations, such as in outside areas, there may not be a ceiling. Recall from the example above that location can be determined more accurately with a higher density of RF tag circuits and a shorter range of the modulated RF energy ($RF_M$). The lower average distance from the bottom surface to the mobile device allows use of a shorter range of modulated RF energy ($RF_M$). Further, some buildings may have ceilings at different heights depending on location (e.g., large multi-level shopping malls often have large open areas where the ceiling may be several stories above the shoppers and stores where the ceiling may be several feet above the shoppers). Disposing the RF tag circuits in the ceilings of these buildings would lead to significant variability (and hence decreased accuracy).

The RF tag circuits 4a, 4b, 4c are not limited to any particular configuration. Merely by way of example, the RF tag circuits 4a, 4b, 4c may each include at least an antenna and an integrated circuit. The antenna may be used for receiving and emitting RF energy, and the integrated circuit may be used for storing and processing data, modulating and demodulating RF signals, collecting power from the RF exciters 2a, 2b, and/or other functions. The processor may include memory or the RF tag circuits 4a, 4b, 4c may include a separate memory. Each of these components may be configured in accordance with known techniques.

In some embodiments an antenna of the RF tag circuits 4a, 4b, 4c is configured to emit the modulated RF energy ($RF_M$) upwards in a direction away from the bottom surface. For example, in an embodiment the RF tag circuits 4a, 4b, 4c emit the modulated RF energy ($RF_M$) in a direction substantially perpendicular to the bottom surface. This can increase accuracy in determining the location of the mobile device 6 by limiting the lateral range of the modulated RF energy ($RF_M$).

The exemplary system shown in FIG. 1 includes two RF exciters 2a, 2b. Actual systems may include more or fewer RF exciters depending on the range of the unmodulated RF energy ($RF_E$) emitted from the RF exciters 2a, 2b and the size of the area (or the grid of the RF tag circuits 4a, 4b, 4c). The unmodulated RF energy ($RF_E$) is used to power the RF tag circuits 4a, 4b, 4c. The RF exciters may be elevated above the bottom surface of the area to increase the range of the unmodulated RF energy ($RF_E$) throughout the area. The RF exciters 2a, 2b may emit the unmodulated RF energy ($RF_E$) using RFID, WiFi, Bluetooth, or any similar technology, protocol, or standard. For example, in an embodiment the RF exciters 2a, 2b are RFID sources configured to emit unmodulated RFID signals. In another embodiment, the RF exciters 2a, 2b are WiFi access points configured to emit unmodulated WiFi signals. Other alternatives may be used in other embodiments.

The RF exciters 2a, 2b are not limited to any particular configuration. Merely by way of example, the RF exciters 2a, 2b may include standard electronic and communication components such an antenna, processor, memory, and power supply. While the RF exciters 2a, 2b are not limited to any particular configuration, and any RF source may be used with embodiments of the invention, in general the antenna may be used for emitting the unmodulated RF energy ($RF_E$), the processor may be used to control communications, the same or a different processor may be used for processing data and executing applications, the memory may be used for storing information, and the power supply may provide power to the various components. Each of these components may be configured in accordance with known techniques.

The mobile device 6 is not limited to any particular device and may be a smartphone in some embodiments. The mobile device 6 is configured to receive the modulated RF energy ($RF_M$) emitted from one or more of the RF tag circuits 4a, 4b, 4c and to determine its location within the area using the location information carried by the modulated RF energy ($RF_M$). The mobile device 6 may receive the modulated RF energy ($RF_M$) using RFID, WiFi, Bluetooth, or any similar technology, protocol, or standard. The example shown in FIG. 1 only includes 1 mobile device 6 for simplicity, but any number of mobile devices may exist in the area at a particular time.

Figure 2:
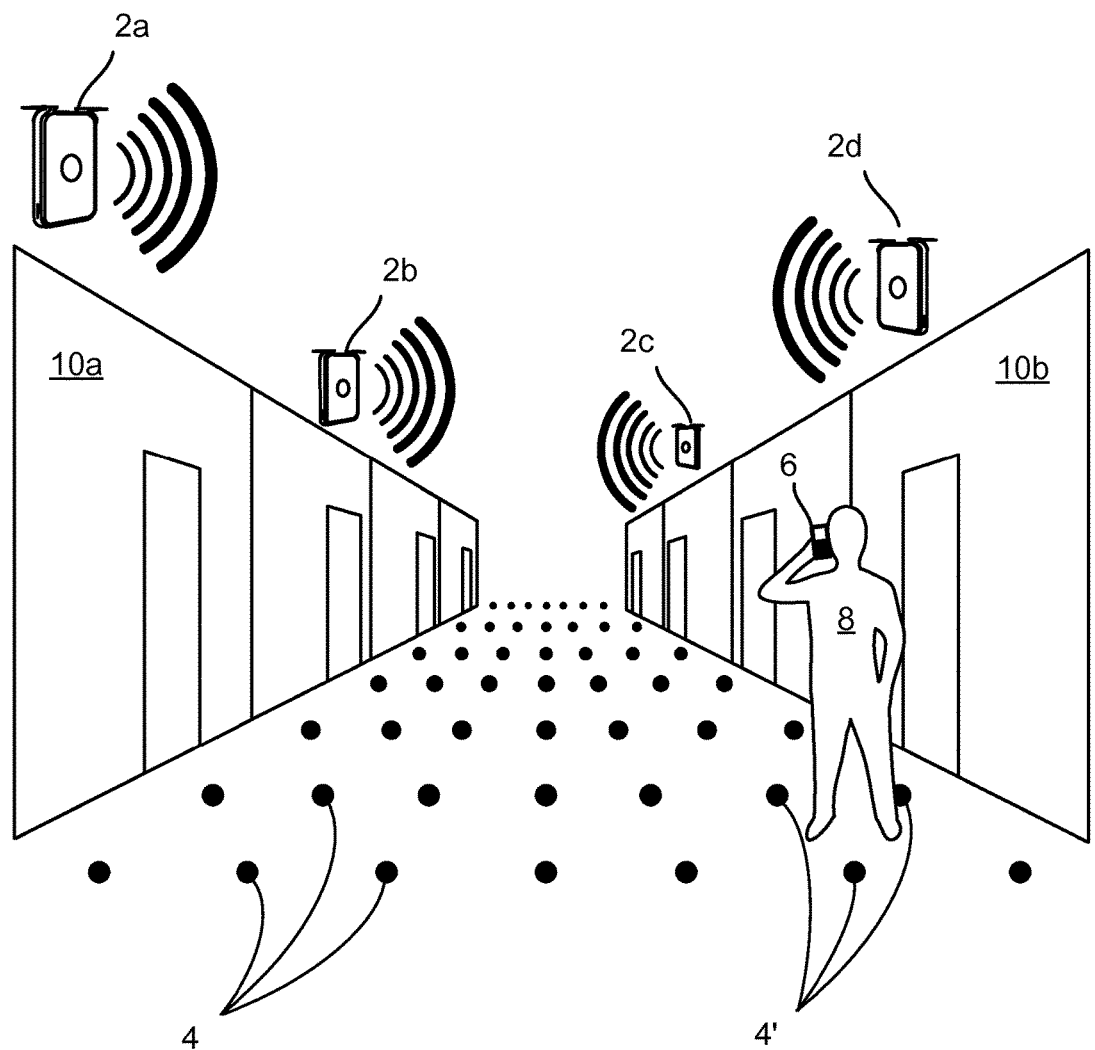

FIG. 2 is a simplified diagram of a system for determining a location of a mobile device within an area defined by a grid of RF tag circuits in accordance with an embodiment. This example shows a user 8 carrying a mobile device 6 within a mall or shopping center that includes store fronts 10a, 10b on each side. A plurality of RF tag circuits 4 are arranged in a grid pattern along the floor (or ground) between the store fronts 10a, 10b. A plurality of RF exciters 2a, 2b, 2c, 2d are disposed above the store fronts 10a, 10b.

Similar to the embodiment described above with regard to FIG. 1, the RF exciters 2a, 2b, 2c, 2d may be configured to emit unmodulated RF energy, and the RF tag circuits 4 may be configured to receive the unmodulated RF energy and to emit modulated RF energy. The modulated RF energy emitted from each RF tag circuit may include information identifying its location within the area. In this example, the mobile device 6 receives the modulated RF energy from three RF tag circuits 4' and determines its location within the area based on the information carried by the modulated RF energy from the RF tag circuits 4'.

The particular application illustrated in FIG. 2 is used merely as an example and is not intended to be limiting. For example, in some embodiments the RF tag circuits may be disposed within a store, within a parking lot or along a road, within a stadium or arena, or in any other location. Further, in some embodiments the RF tag circuits 4 may be programmed with other information as well (e.g., nearest store, nearest exit, directions to a particular store, directions to an exit, directions to locations of particular products, and the like). The RF tag circuits 4 may be password protected to prevent tampering. The mobile device 6 may receive the information from the RF tag circuits 4 and present the information to a user (e.g., via text and/or symbols on a screen, an audio output, or the like).

Figure 3:
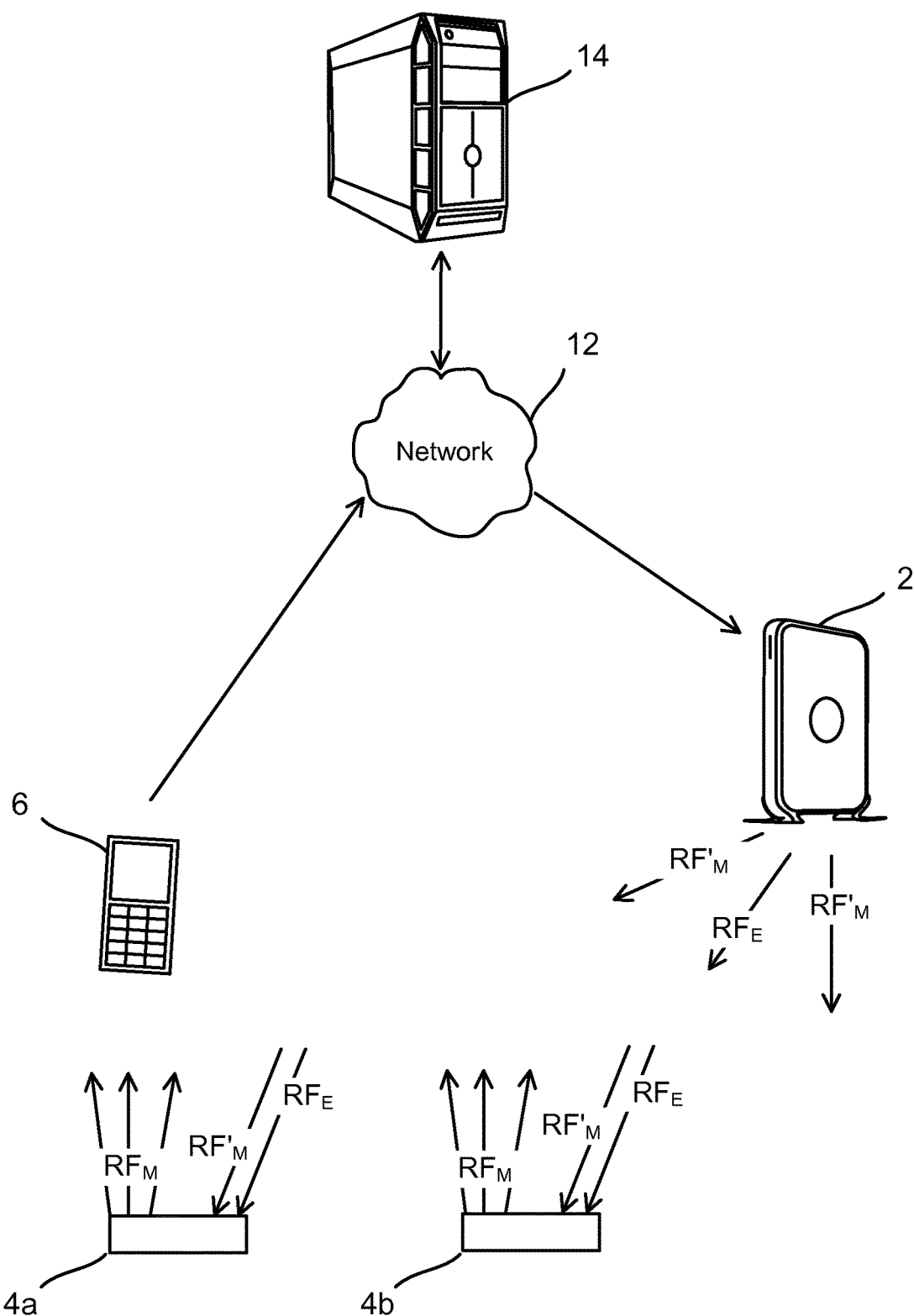
FIGS. 3-4 are simplified diagrams of systems for providing a path through an area defined by a grid of RF tag circuits in accordance with some embodiments.

FIG. 3 is a simplified diagram of a system for providing a path through an area defined by a grid of RF tag circuits in accordance with an embodiment. Like previous embodiments, RF tag circuits 4a, 4b may receive unmodulated RF energy ($RF_E$) emitted from an RF exciter 2 and emit modulated RF energy ($RF_M$) that may be received by a mobile device 6. The mobile device 6 may determine its location in the area using information from one or more of the RF tag circuits 4a, 4b.

This example also includes a network 12 and a server 14. The mobile device 6 communicates with the server 14 via the network 12 in accordance with known techniques (e.g., via a gateway), and the server 14 communicates with the RF exciter 2 via the network 12 in accordance with known techniques. The communications may include wired and wireless portions.

To illustrate, the mobile device 6 may send its current location (determined as explained above) along with an inquiry (such as how do I get to the nearest exit?) to the server 14. A user of the mobile device 6 may input the inquiry e.g., using a keypad, touchscreen, voice command, etc. The server 14 may be configured with a map of the RF tag circuits within the area as well as other information related to the area (such as locations of shops, exits, particular products, etc.). The server 14 may be configured to identify a first RF tag circuit that is proximate to the location of the mobile device 6 as a starting location, and identify a second RF tag circuit that is proximate to the nearest exit (a desired destination). The desired destination may be at another location within the area or it may be proximate to the area. The server 14 may also identify the RF tag circuits that are along a path between the starting location and the nearest exit. Path length, congestion, and/or other preferences may be considered when determining the path. The preferences may be sent with the inquiry or stored as user preferences at the server 14. The server 14 may send instructions to the RF tag circuits along the path via the RF exciter 2. Hence, as illustrated in FIG. 2, the RF exciter 2 in this example is also configured to emit modulated RF energy ($RF'_M$), and the RF tag circuits are configured to receive the modulated RF energy ($RF'_M$). The modulated RF energy ($RF'_M$) may carry the instructions to the RF tag circuits along the path (or to all the RF tag circuits, but only those along the path act on the instructions). In this case the RF tag circuits 4a, 4b may have unique identifiers and be individually addressable so that specific instructions may be sent to individual RF tag circuits.

The instructions may direct the RF tag circuits along the path to activate a signal (such as an audio or visual signal). In this example, each of the RF tag circuits 4a, 4b may include a signal source or be electronically coupled with a signal source. In some embodiments, the signal source may be an electro luminescent pad (EIP) that provides a visible glow when activated. Illumination of the EIPs may include a combination of colors and intensity. In other embodiments, adjacent RF tag circuits may also be illuminated to provide a pattern or convey a message to the user of the mobile device 6. For example, the patterns can form a sequence of EIP illuminations in a direction toward the desired destination. The EIP illumination can be coded by color or illumination interval to distinguish paths associated with different users. Alternatively, the signal source may provide one or more "beeps" or other distinct sounds to identify the path to the destination. The signal may be activated continuously for a period of time or intermittently over a period of time. As the user moves along the path, the mobile device 6 can send updated location information to the server so that the path can be updated accordingly. Using the updated location information, as the user moves along the path one or more next signal sources may be activated as one or more previous signal sources along the path are deactivated. In this manner, only a limited number of the signal sources along the path may be activated at a given time rather than all of the signal sources along the entire path (only those closest to or directly in front of the user).

In some embodiments, a user may be directed to an existing path that leads to a desired destination (rather than creating a new path from the user to the destination). The existing path may be one that was created previously for another user, or it may be a global path that is created for a number of users (e.g., emergency exit in a building). In this case a partial path may be created that leads to the global path.

In another embodiment, the user of the mobile device 6 may request a service, and the server may identify a path between a provider of the service and the user of the mobile device 6. Thus, the provider of the service may be led to the user instead of leading the user to the desired destination. As an example, the user may request medical assistance, and a path may be provided from a medical assistance provider (e.g., a paramedic) to the user. As another example, the user may request food or a beverage, and a path may be provided that leads a roving food and beverage provider to the user. The server may notify the food and beverage provider of the request as well as provide the path to the user. User preferences may be used in identifying a specific food and beverage provider. Alternatively, the server could provide the user with a list of options in response to the request and the user could select a specific food and beverage provider. As yet another example, the server could identify overcrowding at an exit and lead the user to a more accessible exit.

Similar to the embodiment described above with regard to FIG. 2, the RF tag circuits 4a, 4b may be passive devices that are powered by the unmodulated RF energy ($RF_E$). The RF tag circuits may also be powered by the modulated RF energy ($RF'_M$). The RF exciter 2 may emit modulated RF energy ($RF'_M$) when instructions are to be sent to the RF tag circuits and unmodulated RF energy ($RF_E$) during other time periods. Alternatively, the RF exciter 2 may emit both unmodulated RF energy ($RF_E$) and modulated RF energy ($RF'_M$) simultaneously. In either case, the RF tag circuits 4a, 4b may be powered by the RF energy emitted from the RF exciter 2.

The RF exciter 2 may emit the unmodulated RF energy ($RF_E$) and the modulated RF energy ($RF'_M$) using RFID, WiFi, Bluetooth, or any similar technology, protocol, or standard. Similarly, the RF tag circuits 4a, 4b may receive the unmodulated RF energy ($RF_E$) and the modulated RF energy ($RF'_M$) using RFID, WiFi, Bluetooth, or any similar technology, protocol, or standard.

The network 12 may be any type of network such as the Internet, a wide area network (WAN), a local area network (LAN), or the like. The server 14 may include familiar server components such as operating systems, processors, local memory for storage, I/O devices, and system buses interconnecting the hardware components. RAM and disk drives are examples of local memory for storage of data and computer programs. Other types of local memory include magnetic storage media, optical storage media, flash memory, networked storage devices, and the like.

Figure 4:
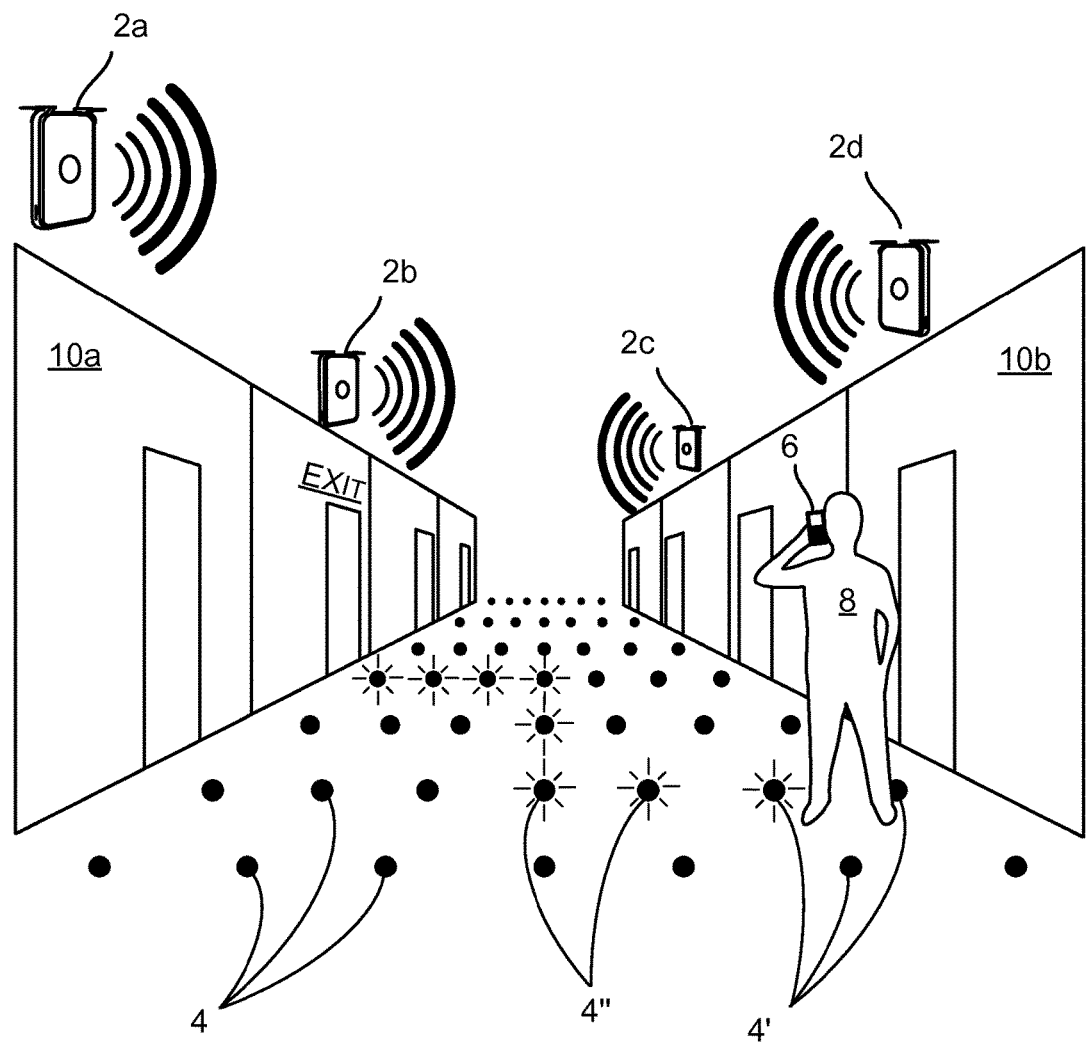

FIG. 4 is a simplified diagram of a system for providing a path through an area defined by a grid of RF tag circuits in accordance with an embodiment. This example shows a user 8 carrying a mobile device 6 within a mall or shopping center that includes store fronts 10a, 10b on each side. A plurality of RF tag circuits 4 are arranged in a grid pattern along the floor (or ground) between the store fronts 10a, 10b. A plurality of RF exciters 2a, 2b, 2c, 2d are disposed above the store fronts 10a, 10b.

Similar to the embodiment described above with regard to FIG. 3, the RF exciters 2a, 2b, 2c, 2d may be configured to emit unmodulated RF energy, and the RF tag circuits 4 may be configured to receive the unmodulated RF energy and to emit modulated RF energy. The modulated RF energy emitted from each RF tag circuit may include information identifying its location within the area. In this example, the mobile device 6 receives the modulated RF energy from three RF tag circuits 4' and determines its location within the area based on the information carried by the modulated RF energy from the RF tag circuits 4'.

In this example, the mobile device 6 may send its current location along with an inquiry or request to a server (not shown) via a network (not shown). The inquiry may be for directions to a nearby location (such as how do I get to the nearest exit?). The server may identify the RF tag circuits 4" that are along a path between the mobile device 6 and the nearest exit (the desired destination). The server may send instructions to the RF tag circuits 4" along the path via the RF exciters 2a, 2b, 2c, 2d. Hence, the RF exciters 2a, 2b, 2c, 2d in this example are also configured to emit modulated RF energy, and the RF tag circuits are configured to receive the modulated RF energy. The modulated RF energy may carry the instructions to the RF tag circuits 4" along the path (or to all the RF tag circuits, but only those along the path act on the instructions). The instructions may direct the RF tag circuits 4" along the path to activate a signal (such as an audio or visual signal) as illustrated in FIG. 4.

Figure 5:
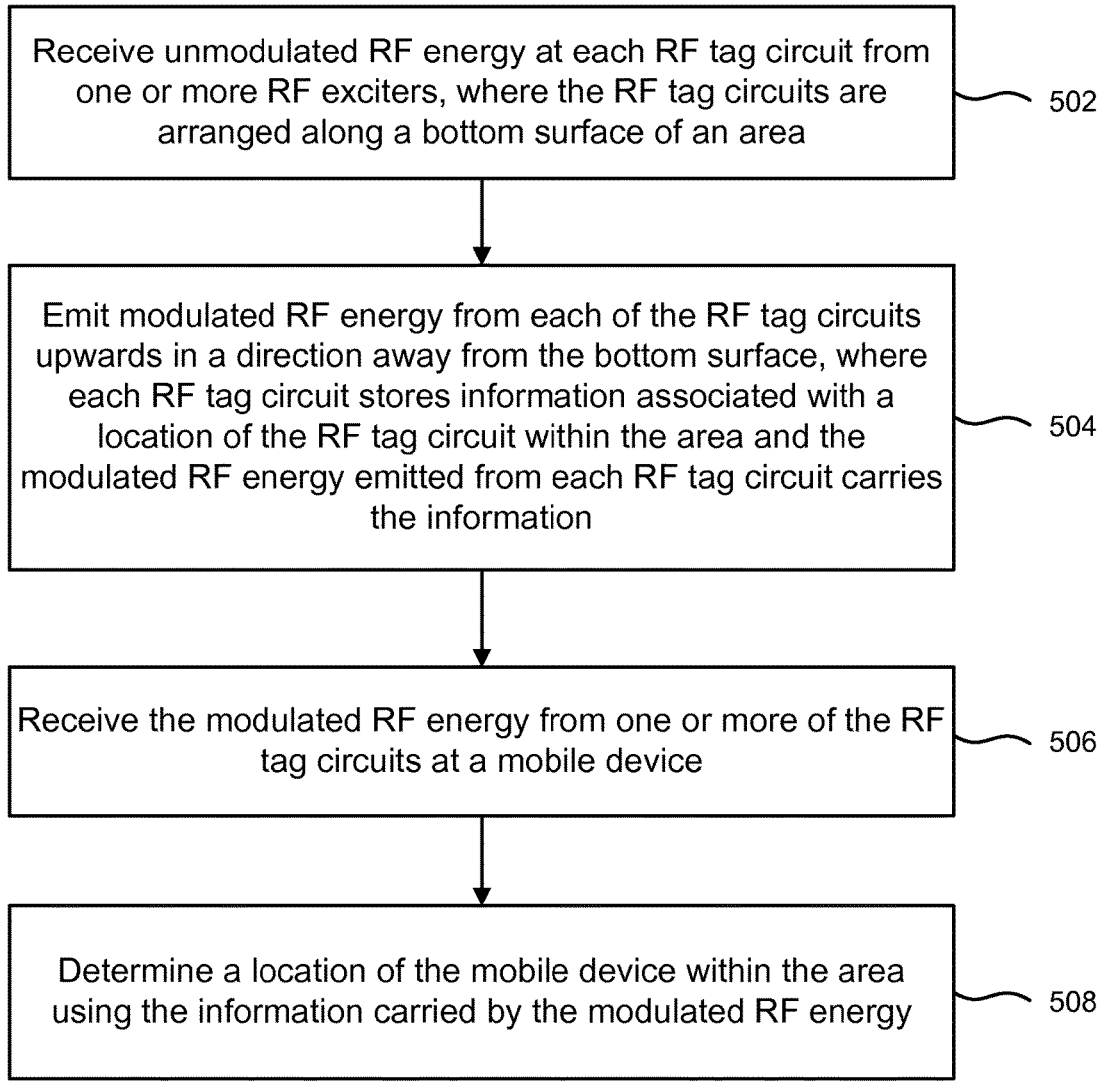
FIG. 5 is a flowchart illustrating a method for providing location information within an area defined by a grid of RF tag circuits in accordance with an embodiment.

FIG. 5 is a flowchart illustrating a method for providing location information within an area defined by a grid of RF tag circuits in accordance with an embodiment. Unmodulated RF energy is received at each RF tag circuit from one or more RF exciters, where the RF tag circuits are arranged along a bottom surface of an area (502). The bottom surface may be the floor of a building or the ground of an outside area. The RF tag circuits may be passive devices that are powered by the unmodulated RF energy.

Modulated RF energy is emitted from each of the RF tag circuits upwards in a direction away from the bottom surface, where each RF tag circuit stores information associated with a location of the RF tag circuit within the area and the modulated RF energy emitted from each RF tag circuit carries the information (504). The information may include the coordinates of the RF tag circuit in the area.

The modulated RF energy is received from one or more of the RF tag circuits at a mobile device (506). The mobile device may be an electronic device such as a smartphone.

A location of the mobile device within the area is determined using the information carried by the modulated RF energy (508). The location of the mobile device may be determined based on an average of the locations of the RF tag circuits from which the mobile device receives modulated RF energy.

Figure 6:
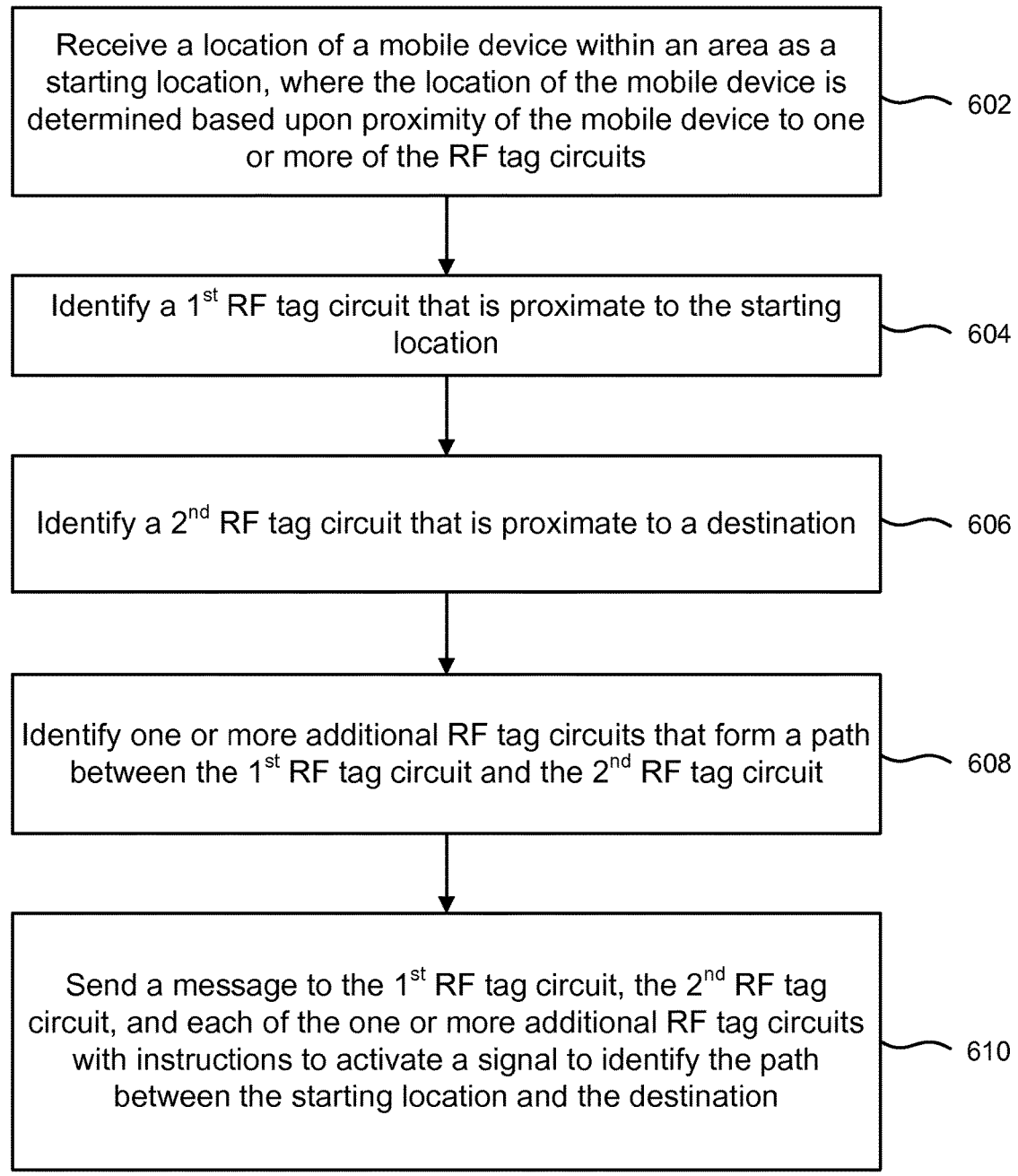
FIG. 6 is a flowchart illustrating a method for providing a path through an area defined by a grid of RF tag circuits in accordance with an embodiment.

FIG. 6 is a flowchart illustrating a method for providing a path through an area defined by a grid of RF tag circuits in accordance with an embodiment. A location of a mobile device within an area is received as a starting location (602). The location may be received at a server. Along with the location, the mobile device may send a query or request for directions to a destination. The server may be configured with a map of RF tag circuits within the area as well as other information related to the area (such as the location of the destination).

A first RF tag circuit is identified that is proximate to the starting location (604), a second RF tag circuit is identified that is proximate to a destination (606), and one or more additional RF tag circuits are identified that form a path between the first RF tag circuit and the second RF tag circuit (608). The RF tag circuits along the path may be identified by the server based on preferences associated with the mobile device and/or a user of the mobile device.

A message is sent to the first RF tag circuit, the second RF tag circuit, and each of the one or more additional RF tag circuits with instructions to activate a signal to identify the path between the starting location and the destination (610). The message is sent from the server and may be communicated to the RF tag circuits via one or more RF exciters. The activated signals identify the path to the user of the mobile device.

It should be appreciated that the specific steps illustrated in FIGS. 5-6 provide particular methods in accordance with some embodiments. Other sequences of steps may also be performed according to alternative embodiments. For example, alternative embodiments may perform the steps outlined above in a different order. Moreover, the individual steps illustrated in FIGS. 5-6 may include multiple sub-steps that may be performed in various sequences. Furthermore, additional steps may be added or removed depending on the particular application.

Some embodiments of the present invention may be implemented by hardware, software, firmware, virtual machine, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description but with reference to the appended claims along with their full scope of equivalents.

What is claimed is:

1. A system for determining a location within an area using a grid of radio-frequency (RF) tag circuits, comprising:
   a plurality of RF exciters, wherein:
      the plurality of RF exciters are permanently placed within the area;
      the plurality of RF exciters are fixed in relation to the grid of RF tag circuits; and
      the plurality of RF exciters are configured to emit unmodulated RF energy;
   the grid of RF tag circuits arranged along a bottom surface of the area and configured to:
      receive the unmodulated RF energy from one or more of the plurality of RF exciters; and
      emit modulated RF energy upwards in a direction away from the bottom surface toward a mobile device, where each RF tag circuit stores information associated with a location of the RF tag circuit within the area; and
   the mobile device, wherein:
      the mobile device is a smart phone;
      the mobile device receives the modulated RF energy;
      the mobile device determines a position of the mobile device based on receiving the modulated RF energy;
      the mobile device is mobile in relation to the RF tag circuits;
      the mobile device is separate from the plurality of RF exciters; and
      the modulated RF energy emitted from each RF tag circuit carries the information.

2. The system of claim 1 wherein the plurality of RF exciters are configured to use at least one of a radio-frequency identification (RFID), WiFi, or Bluetooth technology to emit the unmodulated RF energy, and the RF tag circuits are configured to use at least one of an RFID, WiFi, or Bluetooth technology to receive the unmodulated RF energy and to emit the modulated RF energy.

3. The system of claim 1 wherein RF tag circuits of the grid of RF tag circuits have a maximum range of modulated RF energy that is less than a distance between adjacent RF tag circuits.

4. The system of claim 1 wherein the plurality of RF exciters are disposed above store fronts within the area.

5. The system of claim 1 wherein the RF tag circuits emit the modulated RF energy upwards in a direction substantially perpendicular to the bottom surface.

6. The system of claim 1 wherein the bottom surface of the area is a floor of a building.

7. The system of claim 1 wherein the plurality of RF exciters are further configured to emit modulated RF energy for carrying messages to the RF tag circuits.

8. The system of claim 1 wherein the RF tag circuits are individually addressable and configured to receive messages from the plurality of RF exciters and to activate an audio or visual signal in response to receiving one of the messages.

9. The system of claim 1 further comprising a server configured to receive communications from the mobile device and to send communications to the plurality of RF exciters,
   wherein the plurality of RF exciters are further configured to emit modulated RF energy for carrying messages to the RF tag circuits,
   wherein the RF tag circuits are individually addressable and configured to receive the messages from the plurality of RF exciters and to activate an audio or visual signal in response to receiving one of the messages, and
   wherein based on the communications received from the mobile device, the server is configured to send the messages addressed to certain ones of the RF tag circuits to the plurality of RF exciters for relay to the certain ones of the RF tag circuits.

10. A method for providing location information within an area using a grid of radio-frequency (RF) tag circuits, the method comprising:
   receiving unmodulated RF energy at each of the RF tag circuits from one or more RF exciters, where:
      the one or more RF exciters are permanently placed within the area;
      the plurality of RF exciters are fixed in relation to the grid of RF tag circuits;
      the unmodulated RF energy provides power for each of the RF tag circuits; and
      the RF tag circuits are arranged along a bottom surface of the area; and
   emitting modulated RF energy from each of the RF tag circuits upwards in a direction away from the bottom surface toward a mobile device, where:
      the mobile device is a smart phone;
      the mobile device is mobile in relation to the grid of RF tag circuits;
      the mobile device receives the modulated RF energy;
      the mobile device determines a position of the mobile device based on receiving the modulated RF energy;
      the mobile device is separate from the plurality of RF exciters;
      each RF tag circuit stores information associated with a location of the RF tag circuit within the area; and
      the modulated RF energy emitted from each RF tag circuit carries the information associated with the location of the RF tag circuit within the area.

11. The method of claim 10 wherein at least one of a radio-frequency identification (RFID), WiFi, or Bluetooth technology is used by the RF tag circuits to receive the unmodulated RF energy and to emit the modulated RF energy.

12. The method of claim 10 wherein the RF tag circuits are passive radio-frequency identification (RFID) tag circuits.

13. The method of claim 10 wherein the RF tag circuits emit the modulated RF energy upwards in a direction substantially perpendicular to the bottom surface.

14. The method of claim 10 further comprising emitting, using the RF exciters, modulated RF energy to carry messages to the RF tag circuits.

15. The method of claim 10 wherein:
the RF tag circuits are individually addressable; and
the method further comprises:
   receiving messages at the RF circuits; and
   activating an audio or visual signal in response to receiving one of the messages.

16. The method of claim 10 further comprising:
receiving communication from the mobile device at a server;
sending, using the sever, communications to the plurality of RF exciters based on receiving communication from the mobile device;
emitting, using the RF exciters, modulated RF energy carrying a message to an RF tag of the RF tag circuits based on the communications to the plurality of RF exciters; and
activating an audio or visual signal in response to the RF tag receiving the message.

\* \* \* \* \*